Sept. 3, 1935.  W. B. DAMSEL  2,013,267

PIPE JOINT

Filed April 4, 1934

Inventor
W. B. Damsel

By Seymour & Bright
Attorneys

Patented Sept. 3, 1935

2,013,267

UNITED STATES PATENT OFFICE 2,013,267

PIPE JOINT

William B. Damsel, New York, N. Y.

Application April 4, 1934, Serial No. 719,000

3 Claims. (Cl. 285—194)

This invention relates to improvements in pipe joints and more especially to novel means for protecting and reinforcing the packing gaskets of such joints.

In pipe joints of the type employing channel-shaped packing rings formed of rubber or the like, it is well known that when the pipe line is subjected to sub-atmospheric pressure, the web or peripheral portion of the packing ring caves inwardly and this results in distortion of the ring and leakage of the joint.

It is also known that when the packing rings are made of rubber and the pipe line is conveying gasoline or the like, such a fluid will attack the rubber and this results in deterioration of the ring. Therefore, a primary object of the present invention is to provide a reinforcing and protecting ring which may be introduced into the packing ring to prevent the latter from caving inwardly and to protect the web from deterioration brought about by the passage of certain fluids through the line.

Another object is to furnish a metallic reinforcing and protecting collar which may not only be slipped into a packing ring, but which may expand and contract circumferentially coincident with the expansion and contraction of the packing ring.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
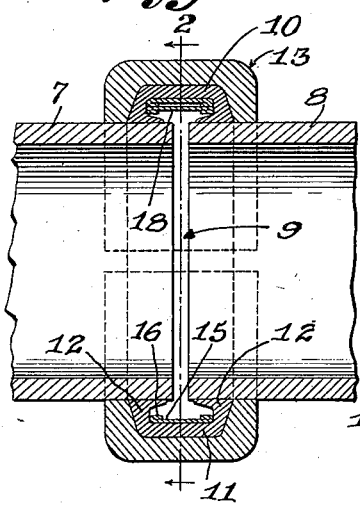
Fig. 1 is a longitudinal sectional view of a portion of a pipe line and illustrating a joint provided with one form of my improved reinforcing and protecting ring, said view being taken on the line 1—1 of Fig. 2.
Figure 2:
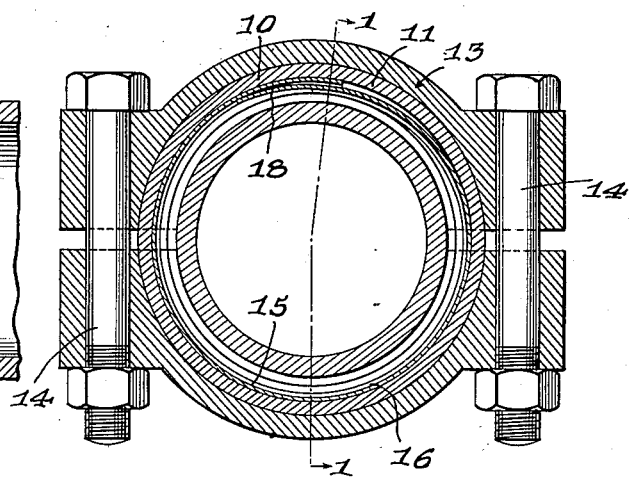
Fig. 2 is a transverse sectional view on the line 2—2 of Fig. 1.
Figure 3:
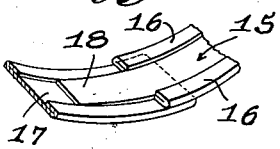
Fig. 3 is a perspective view of the overlapping end portions of the reinforcing and protecting ring.

Referring to Figs. 1 to 3 inclusive, 7 and 8 designate the adjacent ends of pipes forming part of a pipe line. In actual practice these ends are spaced apart as indicated at 9 and the gap is bridged by a channel-shaped packing ring 10 consisting of a web 11 and lips 12; the ring being housed within a conventional split metallic housing 13 provided with connecting bolts 14.

The gaskets 10 of such pipe joints are usually placed on pipe lines initially operated in pressure service. When so operated, the internal pressure forces the web 11 against the housing. Subsequently when the line is placed on vacuum service, there is a tendency for the web 11 to be sucked inwardly and this causes leakage. In accordance with the invention, I arrange within the channel of the gasket a reinforcing and protecting ring 15 having sufficient rigidity to resist caving in of the web 11. Such ring may be made of a strip of resilient metal having its edges folded over, as shown at 16, for the purpose of stiffening the ring and providing a groove 17 in which a tongue 18 at one end of the ring may slide. The reinforcing and protecting ring may be slipped into the gasket before the latter is placed on the pipe line and as the ring has a tendency to expand, it will hold the web taut against the housing and eliminate to a considerable extent the action of gasoline or the like on the rubber forming the gasket. Obviously when the pipe line is subjected to vacuum, the reinforcing ring will prevent collapsing of the gasket and thus act to prevent leakage.

Figure 4:
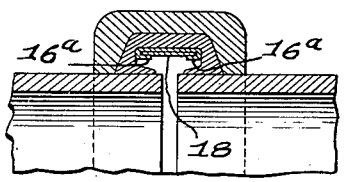
Fig. 4 is a fragmentary view similar to Fig. 1 and showing a modified form of protecting and reinforcing ring.
Figure 5:
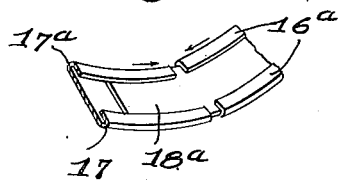
Fig. 5 is a view like Fig. 3 but of the modified ring.

Instead of making the ring in such a way that the tongue 18 is of less width than the ring, the folded over edges 16a of the ring may be left spaced from the inner surface of the ring so as to form guide grooves 17a for a wider tongue 18a, as shown in Figs. 4 and 5. In this modification, it is obvious that the tongue 18a will slide in the edge grooves 17a as the ring expands and contracts.

Figure 6:
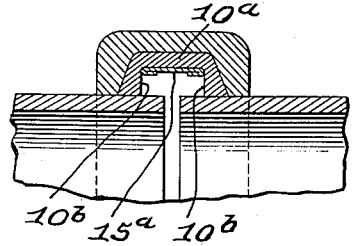
Fig. 6 is a view similar to Fig. 4 but showing the protecting ring cooperating with a packing ring of a different form than that illustrated in Figs. 1, 2, and 4.

While I have shown in Figs. 1, 2, and 4 applications of my improved reinforcing and protecting ring to a special packing gasket of a well known type, it is evident that it may be emloyed with channel-shaped packing rings of other types. For example, in Fig. 6 the ring 15a is shown employed with a packing gasket 10a having parallel surfaces 10b on the inner sides of its lips.

From the foregoing, it is believed the construction and advantages of the improved pipe joint may be readily understood and I am aware that changes may be made in the details disclosed without departing from the spirit of the invention as expressed in the claims.

What I claim and desire to secure by Letters Patent is:

1. The combination with a channel-shaped packing gasket, of a split, imperforate reinforcing and protecting ring arranged in the gasket at the bottom of the channel and having sufficient rigidity to prevent the gasket from caving inwardly the ends of said ring overlapping to permit expansion and contraction of the ring, the edges of the ring being folded over on the body of the same throughout substantially the entire circumference of said ring for reinforcing purposes.

2. The combination with a channel-shaped packing gasket, of a reinforcing and protecting ring arranged in the gasket at the bottom of the channel and having sufficient rigidity to prevent the gasket from caving inwardly, the edge portions of the ring being folded over on to the body of the same throughout substantially the entire circumference of said ring for reinforcing and guiding purposes, the ring being of split construction and provided at one end with a projecting tongue of substantially the same width as the distance between the folded edge portions of the ring, said tongue engaging the edges of said portions and being guided thereby.

3. The combination with a channel-shaped packing gasket, of a reinforcing and protecting ring arranged in the gasket at the bottom of the channel and having sufficient rigidity to prevent the gasket from caving inwardly, said ring being of split construction and having overlapping ends, said ring having its margins folded toward one another throughout substantially its entire circumference for reinforcing purposes and to provide opposite guide grooves, one end portion of the ring having a projecting tongue slidably guided by said grooves.

WILLIAM B. DAMSEL.